(12) United States Patent
Moro

(10) Patent No.: US 10,574,848 B1
(45) Date of Patent: Feb. 25, 2020

(54) INFORMATION PROCESSING APPARATUS WITH REGISTERED IMAGE DETECTION

(71) Applicant: TOSHIBA TEC KABUSHIKI KAISHA, Shinagawa-ku, Tokyo (JP)

(72) Inventor: Akihiro Moro, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/172,494

(22) Filed: Oct. 26, 2018

(51) Int. Cl.
*G06F 15/00* (2006.01)
*G06F 1/00* (2006.01)
*G06K 1/00* (2006.01)
*H04N 1/00* (2006.01)
*G06K 9/20* (2006.01)
G06K 15/00 (2006.01)
G06F 3/12 (2006.01)

(52) U.S. Cl.
CPC ....... *H04N 1/00843* (2013.01); *G06K 9/2054* (2013.01); *H04N 1/00355* (2013.01); *H04N 1/00777* (2013.01); *H04N 1/00925* (2013.01); *H04N 1/00968* (2013.01); *H04N 2201/0081* (2013.01); *H04N 2201/0094* (2013.01)

(58) Field of Classification Search
CPC .......... H04N 1/00843; H04N 1/00355; H04N 1/00777; H04N 1/00925; H04N 1/00968; H04N 2201/0081; H04N 2201/0094; G06K 9/2054
USPC .............................. 358/1.15, 1.1, 1.13, 1.14
See application file for complete search history.

(56) References Cited

U.S. PATENT DOCUMENTS

2006/0062473 A1  3/2006  Moromizato et al.
2012/0288164 A1* 11/2012  Nagashima ........ G06K 9/00281
                                                382/117
2015/0022638 A1*  1/2015  Saeki ................... G06T 7/0004
                                                348/46

* cited by examiner

*Primary Examiner* — Douglas Q Tran
(74) *Attorney, Agent, or Firm* — Foley & Lardner LLP

(57) ABSTRACT

An information processing apparatus includes a setting unit, a detector and a controller. The setting unit sets setting information associating a registered image obtained by reading an image with control information indicating whether input image data is to be stored or not. The detector detects the registered image from the input image data. The controller controls whether or not the input image data including the registered image is stored in a storage based on the setting information.

20 Claims, 17 Drawing Sheets

FIG. 9

| REGISTERED IMAGE | SETTING INFORMATION | | |
|---|---|---|---|
| | CONTROL INFORMATION | | |
| | IMAGE STORAGE | DISPLAY OF DETECTED PAGE FOR WARNING OR CONFIRMATION | ERASURE OF DETECTED IMAGE |
| UNNECESSARY | DELETE DETECTED PAGE | VALID (ON) | - |
| FIRST REGISTERED IMAGE | FIRST CONTROL INFORMATION | | |
| STORAGE | EXTRACT DETECTED PAGE | VALID (ON) | INVALID (OFF) |
| SECOND REGISTERED IMAGE | SECOND CONTROL INFORMATION | | |
| STORAGE | EXTRACT DETECTED PAGE | VALID (ON) | VALID (ON) |
| THIRD REGISTERED IMAGE | THIRD CONTROL INFORMATION | | |
| STRICT PROHIBITION OF COPYING | PROHIBIT ALL-JOB STORAGE | VALID (ON) | - |
| FOURTH REGISTERED IMAGE | FOURTH CONTROL INFORMATION | | |
| : | : | : | : |

INPUT IMAGE (PAGE MEMORY)

OUTPUT IMAGE (STORAGE UNIT)

INPUT IMAGE (PAGE MEMORY)

OUTPUT IMAGE (STORAGE UNIT)

INPUT IMAGE (PAGE MEMORY)

OUTPUT IMAGE (STORAGE UNIT)

FIG. 17

| BOOK ORIGINAL SCAN JOB STORAGE INFORMATION | | ORIGINAL DETECTION POSITION | DETECTION SIZE |
|---|---|---|---|
| BOOK OCR READ INFORMATION (REAR SURFACE) BOOK NAME | Scan Operation Manual | — | — |
| BOOK OCR READ INFORMATION (REAR SURFACE) LIBRARY NAME | ABC Library | — | — |
| BOOK OCR READ INFORMATION (REAR SURFACE) MANAGEMENT No | 123456 | — | — |
| FRONT COVER IMAGE DATA INFORMATION (REAR SURFACE) | FRONT COVER IMAGE DATA B1 | (dx1,dy1) | X1,Y1 |
| ASSOCIATED FIRST PAGE IMAGE DATA INFORMATION (FRONT SURFACE) | FRONT SURFACE IMAGE DATA F1 | (dx2,dy2) | X2,Y2 |
| ASSOCIATED SECOND PAGE IMAGE DATA INFORMATION (FRONT SURFACE) | FRONT SURFACE IMAGE DATA F2 | (dx3,dy3) | X3,Y3 |
| ⋮ | ⋮ | ⋮ | ⋮ |

# INFORMATION PROCESSING APPARATUS WITH REGISTERED IMAGE DETECTION

FIELD

Embodiments described herein relate generally to an information processing apparatus.

BACKGROUND

A copying machine for prohibiting copying of banknotes and securities which are prohibited from being copied is known. Such a copying machine pre-stores digital information of banknotes and the like which are prohibited from being copied, compares a read original image with the digital information, and prohibits the read original image from being copied based on a result of determining that the read original image and the digital information are the same. Such a copying machine is effective in preventing banknotes and the like, which are generally prohibited from being copied, from being copied.

In addition, the copying machine may be used to copy a book original. When the book original is scanned by the copying machine, a user places a page desired to be read of the book original to face the original platen (bottom surface) of the copying machine, and the copying machine reads the image of the page desired to be read by carriage scanning. When the user desires to read a plurality of pages of the book original, the user should turn the pages of the book original, place the page desired to be read to face the original platen again, and enable the copying machine to read the images of the pages desired to be read by carriage scanning of the copying machine. Copy prohibition may be printed on the front cover of a book original. However, the copying machine scans the book original regardless of printing of copy prohibition.

DESCRIPTION OF THE DRAWINGS

FIG. 2 is a block diagram illustrating an example of a schematic configuration of an image processing unit, a system processing unit, a control panel unit and the like;

FIG. 9 is a diagram illustrating an example of setting information associating a registered image with control information;

FIG. 17 is a diagram illustrating an example of storage information acquired by a book original scan mode.

DETAILED DESCRIPTION

Figure 1:
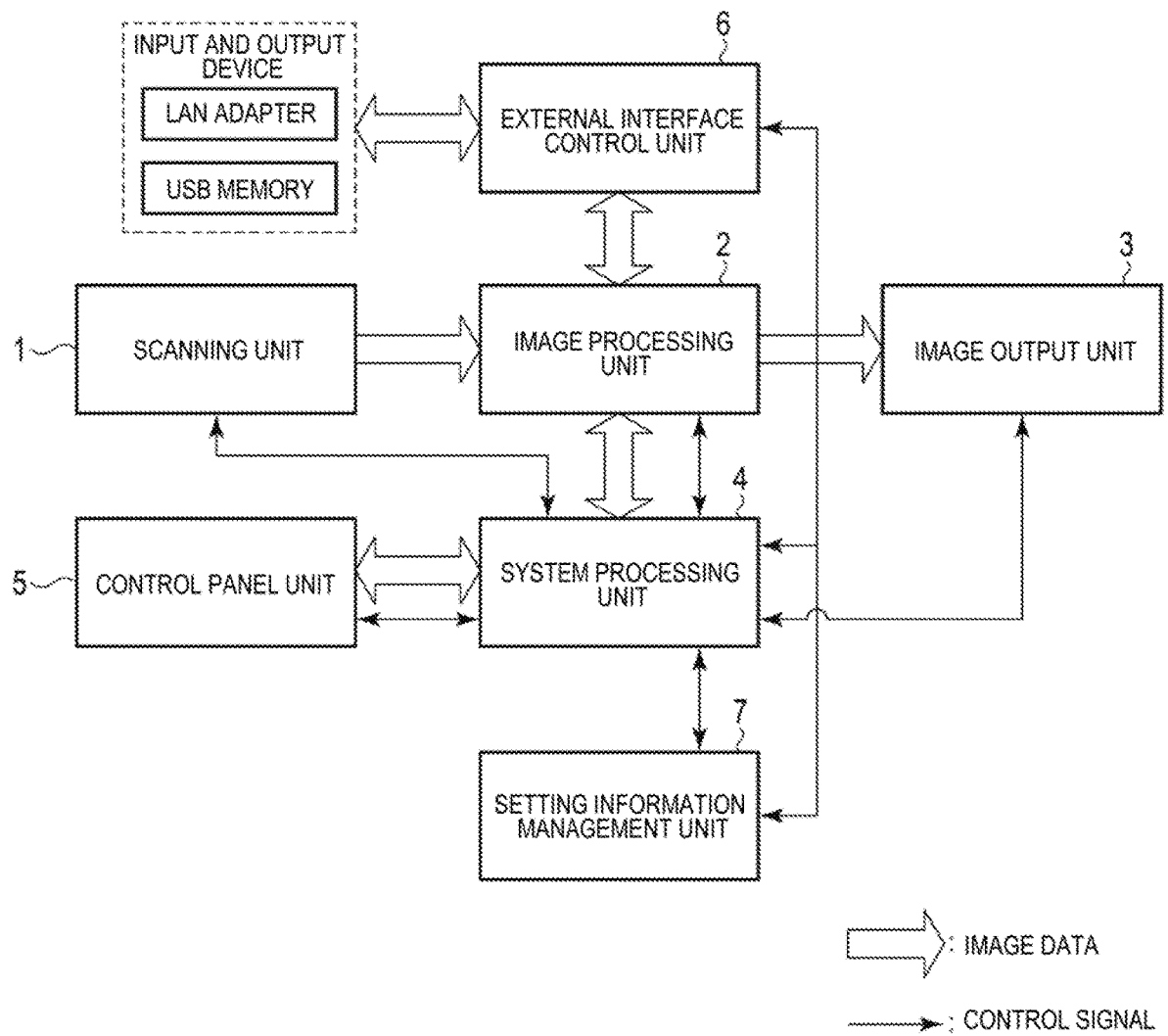
FIG. 1 is a block diagram illustrating an example of a schematic configuration of an image forming apparatus according to at least one embodiment.

Hereinafter, an image forming apparatus as an example of an information processing apparatus according to at least one embodiment will be described using drawings. In addition, the scale and arrangement of units in the drawings used to explain the present embodiment are merely exemplary and are not limited thereto.

FIG. 1 is a block diagram illustrating an example of a schematic configuration of an image forming apparatus according to at least one embodiment.

The image forming apparatus illustrated in FIG. 1 is, for example, a copying machine called a multifunction peripheral (MFP). As illustrated in FIG. 1, the image forming apparatus includes a scanning unit 1, an image processing unit 2, an image output unit 3, a system processing unit 4 (controller), a control panel unit 5, an external interface control unit 6, and a setting information management unit 7.

The scanning unit 1 reads the image of an original set on an original platen to output image data or reads the image of an original fed from an automatic original feeding apparatus called an auto original feeder (ADF) one by one and set on the original platen to output image data, in response to execution of a scanner mode or a copy mode. In addition, the scanning unit 1 reads the image of an original including a registered image, which is set on the original platen, to output image data in response to execution of an image registration mode related to image storage control. In addition, details of image storage control and image registration mode will be described in detail below. In addition, the scanning unit 1 reads an image from a book set on the original platen to output image data in response to execution of a book original scan mode (book original scan job). In addition, details of the book original scan mode will be described in detail below.

The external interface control unit 6 is connected to an input and output device such as a local area network (LAN) adapter or a universal serial bus (USB) memory to input and output image data. In addition, the external interface control unit 6 may input a program or the like through an input and output device. The image processing unit 2 corrects gradation of the image output from the scanning unit 1 or the external interface control unit 6 or improves the image quality of the image data. The image output unit 3 prints the image based on the image data processed by the image processing unit 2.

The control panel unit 5 guides and displays information on operation of the image forming apparatus to the user. In addition, the control panel unit 5 receives operation input from the user and sets a variety of information based on operation input. For example, the control panel unit 5 sets setting information based on operation input from the user. Details of the setting information and setting pieces of the setting information will be described in detail below. The setting information management unit 7 manages (stores) the setting information set by the control panel unit 5.

The system processing unit 4 controls the overall image forming apparatus based on a pre-stored program and information from each unit. For example, the system processing unit 4 performs image storage control, which will be described in detail below.

Figure 2:
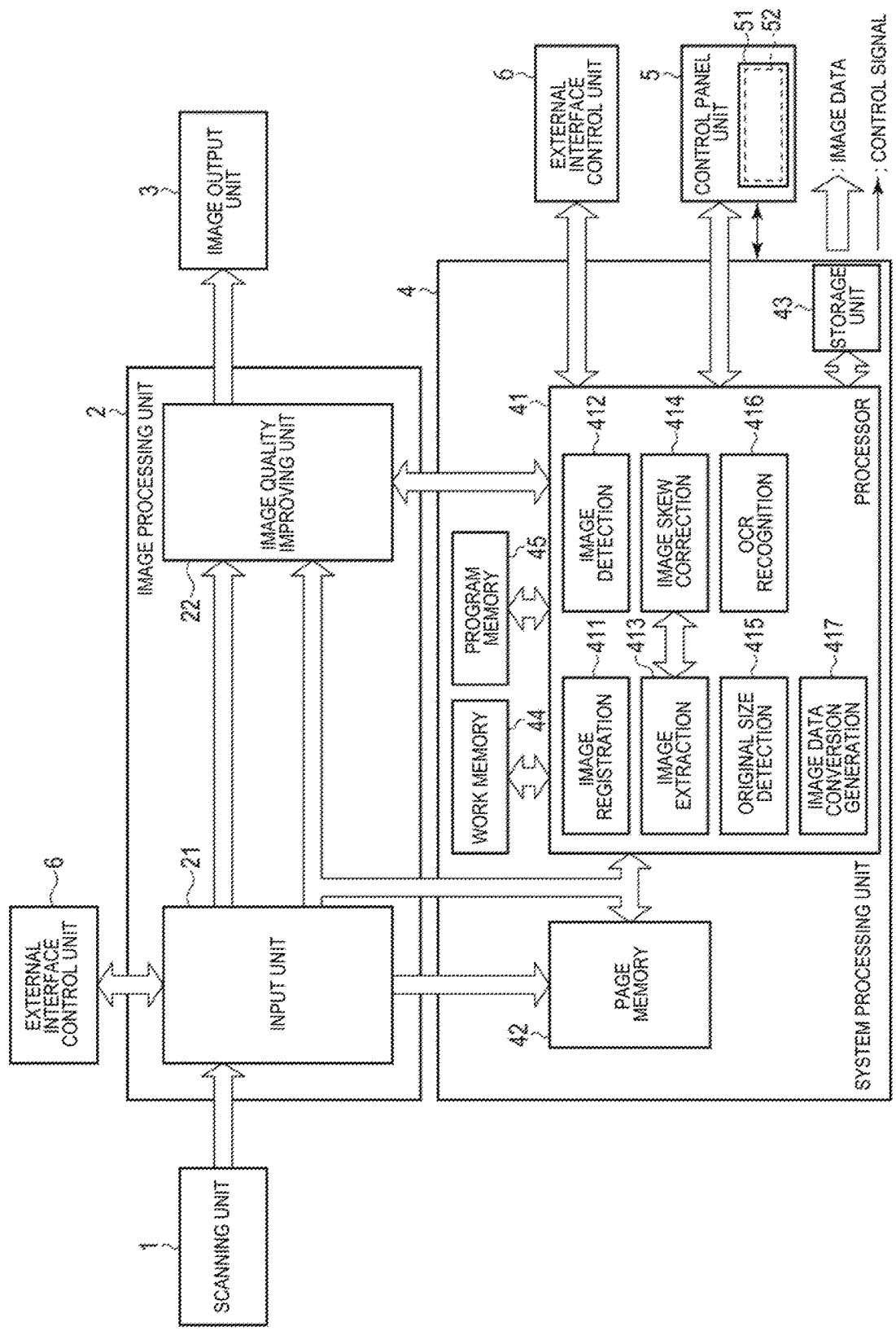

FIG. 2 is a block diagram illustrating an example of a schematic configuration of the image processing unit, the system processing unit, the control panel unit and the like.

As illustrated in FIG. 2, the system processing unit 4 includes a processor 41, a page memory 42, a storage unit 43 (storage), a work memory 44, a program memory 45 and the like. The processor 41 is a central processing unit (CPU), a micro processing unit (MPU), a digital signal processor (DSP), a graphics processing unit (GPU), an application specific integrated circuit (ASIC), or the like. Alternatively, the processor 41 is a combination thereof.

The processor 41 operates based on the program stored in the program memory 45 and, for example, performs an image registration 411, an image detection 412 (detector), an image extraction 413, an image skew correction 414, an original size detection 415, an OCR recognition 416, an image data conversion generation 417 and the like in response to operation input from the user through the control panel unit 5 based on the program stored in the program memory 45. The work memory 44 temporarily stores the program stored in the program memory 45 or temporarily stores data handled by the program.

The image registration is a process of registering a registered image desired by the user in response to execution of an image registration mode related to image storage control. The scanning unit 1 reads the original including the registered image to output original image data in response to execution of the image registration mode. The display unit 51 of the control panel unit 5 displays the image based on the original image data output from the scanning unit 1. The user designates an image region corresponding to the registered image from the displayed image through the input unit 52 of the control panel unit 5. The designated image region is extracted and the image of the image region is registered as registered image data.

The image detection is a process of detecting the registered image from the image data output from the scanning unit 1 based on an image feature amount of the registered image data.

The image extraction is a process of cropping the image data region surrounded by an edge in the image data stored in the page memory 42 as an original region.

The image skew correction is a process of analyzing the inclination of the image data after the image extraction and correcting the inclination when the inclination is present. The image data after image skew correction is temporarily stored in the page memory 42.

The original size detection is a process of specifying an original size corresponding to the image data after the image skew correction.

The OCR recognition is a process of recognizing characters in a region designated in the image data stored in the page memory 42.

The image data conversion generation extracts book related information such as book name from the image data acquired by the book original scan mode and generates book data associating the image data with the book related information. In addition, the image data conversion generation generates book data in a predetermined file format. For example, the storage unit 43 stores the book data. Alternatively, the external interface control unit 6 transmits the book data to the USB memory or the like.

In addition, a procedure such as processing and control described in the present embodiment may be executed by software. Therefore, it is possible to easily process and control, by installing and executing a program in the image forming apparatus through a computer-readable storage medium in which the program for executing the procedure such as processing and control is stored.

For example, the program is read from the computer-readable storage medium through the external interface control unit 6 and the read program is stored in the storage unit 43, thereby completing installation of the program. Therefore, the processor 41 of the image forming apparatus can easily process and control based on the installed program.

The page memory 42 temporarily stores the image data read by the scanning unit 1 and passing through the image processing unit 2. In addition, the page memory 42 temporarily stores the image data output from the external interface control unit 6 and passing through the image processing unit 2. The image data stored in the page memory 42 is expanded into YMCK image data by a raster image processor (RIP) in response to execution of a print mode. The image processing unit 2 improves the image quality of the YMCK image data and the image output unit 3 forms an image based on the YMCK image data, the image quality of which is improved.

The storage unit 43 is an information storage apparatus such as a hard disk drive (HDD) or a solid state drive (SSD) and stores the image data received from the page memory 42. In addition, the storage unit 43 may store part or overall of the program for operating the processor 41.

As illustrated in FIG. 2, the control panel unit 5 includes a display unit 51 and an input unit 52. The display unit 51 is a display device such as a liquid crystal display. The input unit 52 is an input device such as a touch panel installed in correspondence with the display unit. The input unit 52 detects touch input of the user and outputs touch input in correspondence with the position information of the X coordinate and the Y coordinate of the display unit 51. In addition, the input unit 52 may further include an input device such as a hard key. The processor 41 may receive touch input from the input unit 52 and detects input corresponding to the display content of the display unit 51.

As illustrated in FIG. 2, the image processing unit 2 includes an input unit 21 and an image quality improving unit 22. The input unit 21 includes a lookup table (LUT) for correcting gradation reproduction and corrects gradation reproduction in the image data input by the scanning unit 1 or the external interface control unit 6. For example, the processor 41 sets correction of gradation reproduction to hit a highlight side (a small image data side) for image data input by the scanning unit 1 and the input unit 21 corrects gradation reproduction in the image data based on this setting. The image quality improving unit 22 improves the image quality of the image data based on filtering, magnifying, density controlling, gradation process and the like.

Figure 3:
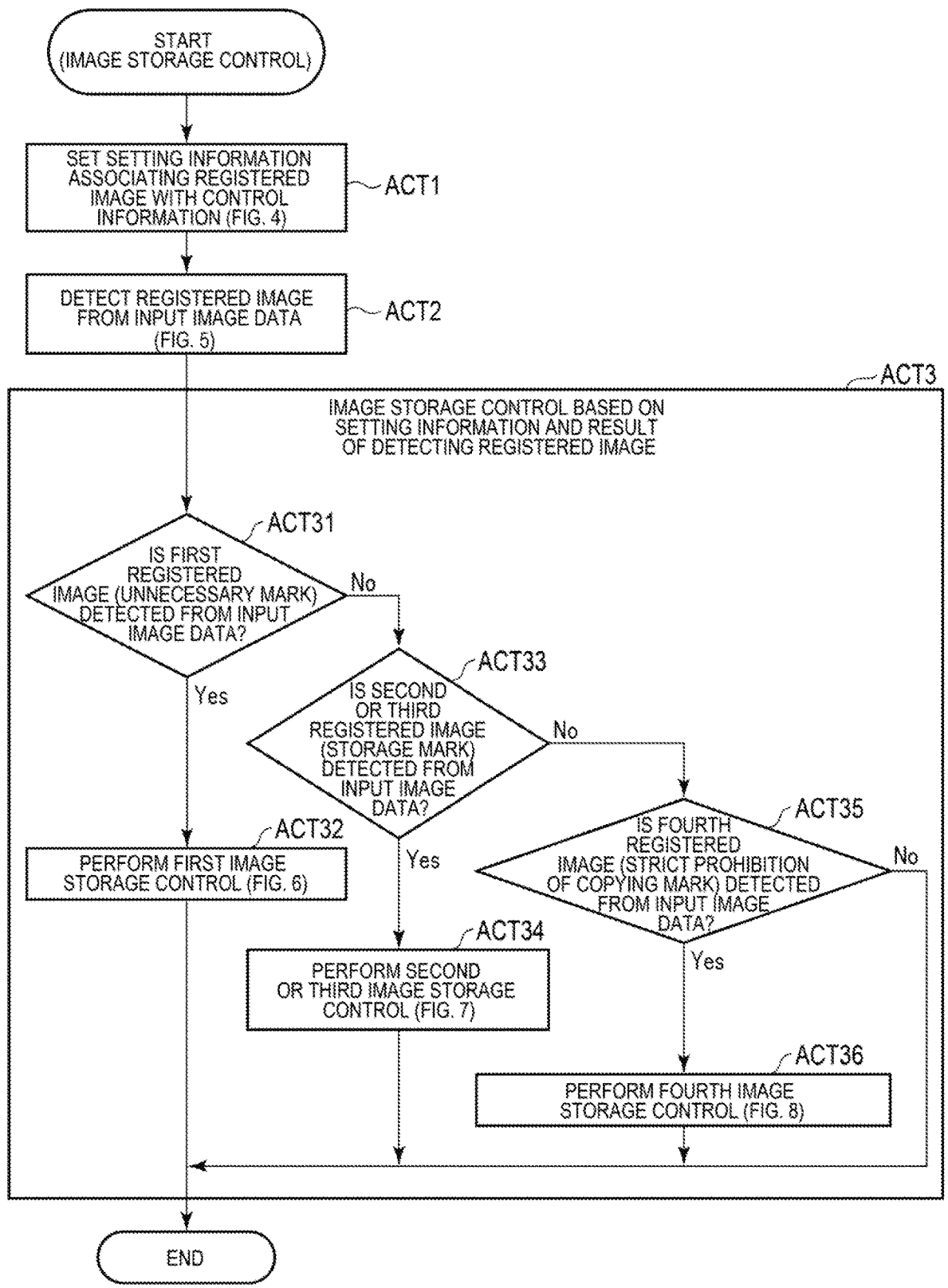
FIG. 3 is a flowchart illustrating an example of image storage controlling (overall flow)

FIG. 3 is a flowchart illustrating an example of image storage controlling (overall flow).

The processor 41 controls whether all or some of the input image data including the registered image is stored in the storage unit 43, based on the setting information associating the registered image obtained by reading the image with the control information related to whether or not the input image data is to be stored. This control is referred to as image storage control.

In order to perform image storage control, the user inputs setting information through the scanning unit 1 and the control panel unit 5. The control panel unit 5 extracts the registered image (the region of the registered image) from the original image data obtained by reading the original image by the scanning unit 1 and sets setting information associating the registered information with the control information, in response to operation input from the user (ACT 1). The setting information management unit 7 manages (stores) the setting information. Setting of the setting information by the control panel unit 5 will be described in detail with reference to the flowchart illustrated in FIG. 4.

FIG. 9 is a diagram illustrating an example of setting information associating a registered image with control information, which is an example of setting information displayed on the display unit 51 of the control panel unit 5. As illustrated in FIG. 9, for example, the control panel unit 5 sets and displays first, second, third and fourth pieces of setting information.

The first setting information associates a first registered image with first control information. The second setting information associates a second registered image with second control information. The third setting information associates a third registered image with third control information. The fourth setting information associates a fourth registered image with fourth control information. Such information will be described in detail below.

Subsequently, the processor 41 detects the registered image included in the setting information from the input image data output from the scanning unit 1 (ACT 2). For example, the processor 41 determines presence or absence of first to fourth registered images included in the first to fourth setting information from the input image data and outputs the result of detecting the registered image. Detection of the registered image will be described in detail with reference to the flowchart illustrated in FIG. 5.

Subsequently, the processor 41 performs image storage control based on the setting information and the result of detecting the registered image (ACT 3). For example, when the first registered image is detected from the input image data (ACT 31, YES), the processor 41 performs first image storage control based on the first setting information associating the first registered image with the first control information and detection of the first registered image (ACT 32). First image storage control will be described in detail with reference to the flowchart illustrated in FIG. 6.

In addition, when the first registered image is not detected from the input image data (ACT 31, NO) and the second registered image is detected from the input image data (ACT 33, YES), the processor 41 performs second image storage control based on the second setting information associating the second registered image with the second control information and detection of the second registered image (ACT 34). Similarly, when the third registered image is detected from the input image data (ACT 33, YES), the processor 41 performs third image storage control based on the third setting information associating the third registered image with the third control information and detection of the third registered image (ACT 34). Third image storage control will be described in detail with reference to the flowchart illustrated in FIG. 7.

In addition, when the second or third registered image is not detected from the input image data (ACT 33, NO) and the fourth registered image is detected from the input image data (ACT 35, YES), the processor 41 performs fourth image storage control based on the fourth setting information associating the fourth registered image with the fourth control information and detection of the fourth registered image (ACT 36). Fourth image storage control will be described in detail with reference to the flowchart illustrated in FIG. 8.

When no registered image is detected, no image storage control is performed.

Figure 4:
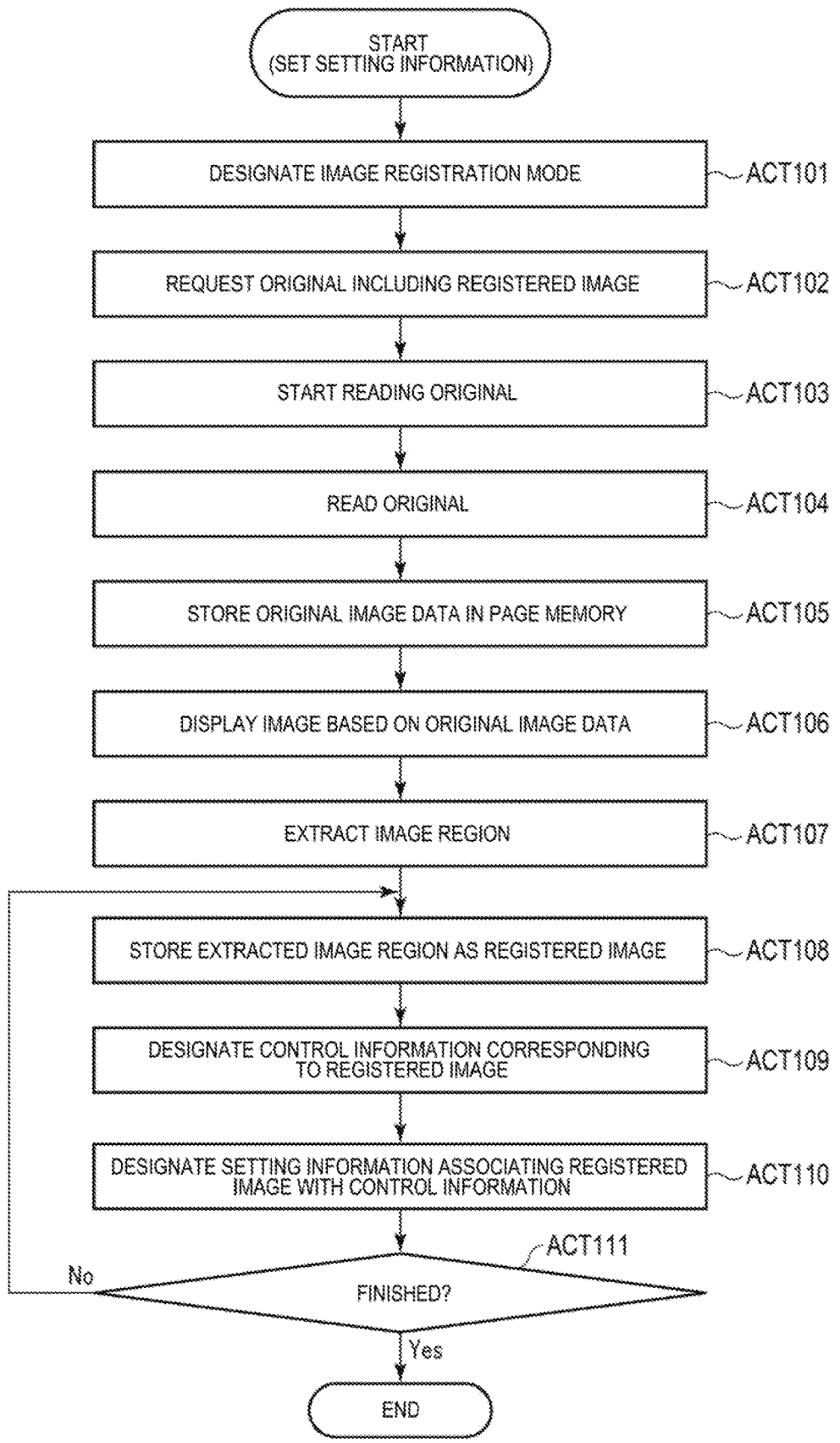
FIG. 4 is a flowchart illustrating an example of setting pieces of setting information.

FIG. 4 is a flowchart illustrating an example of setting pieces of setting information (ACT 1 of FIG. 3).

In order to perform image storage control, the user selects an image registration mode relating to image storage control through the input unit 52 of the control panel unit 5. The control panel unit 5 designates the image registration mode in response to selection of the image registration mode (ACT 101).

The processor 41 performs control to receive reading of the original by the scanning unit 1 and requests the original including the registered image, based on designation of the image registration mode (ACT 102). For example, the display unit 51 of the control panel unit 5 displays a guide to set the original including the registered image on the paten glass.

In the present embodiment, four types of registered images, that is, the first registered image, the second registered image (storage mark), the third registered image (storage mark) and the fourth registered image (strict prohibition of copying mark) illustrated in FIG. 9 are assumed. For example, the user prepares a stamp using an erasable ink or a seal corresponding to the first, second, third and fourth registered images. The user prepares an original attached with the seal corresponding to the first, second, third and fourth registered images or an original on which a stamp is pushed, sets such an original on the original platen, and touches a scan button displayed on the display unit 51 of the control panel unit 5.

The input unit 52 of the control panel unit 5 detects touch of the scan button, and the processor 41 starts reading of the original by the scanning unit 1 based on detection of touch of the scan button (ACT 103). The scanning unit 1 reads the original by carriage scanning (ACT 104) and output original image data read from the original.

The image processing unit 2 stores the original image data output from the scanning unit 1 in the page memory 42 (ACT 105). The processor 41 instructs display of the image based on the original image data stored in the page memory 42 and the display unit 51 of the control panel unit 5 displays the original image corresponding to the original image data (ACT 106).

The user designates a desired image region on the displayed original image by touch input through the input unit 52 while viewing the entire original image displayed on the display unit 51. For example, the user may designate enlargement, reduction, or movement of the displayed original image by touch input through the input unit 52 and designate a desired image region on the displayed original image while enlarging, reducing or moving the displayed original image. The input unit 52 extracts the designated image region (ACT 107), receives the extracted image region as a registered image, and stores the registered image in the setting information management unit 7 (ACT 108).

Although the case of designating the registered image by touch input of the user is described in the present embodiment, the processor 41 may detect an object (a registered image) from the original image data stored in the page memory 42 by object detection technology and store the detected object as a registered image.

By repeating the processes of ACT 102 to ACT 108, a plurality of registered images may be stored in the setting information management unit 7. In the present embodiment, for example, by repeating the processes of ACT 102 to ACT 108, the first registered image (unnecessary mark), the second registered image (storage mark), the third registered image (storage mark) and the fourth registered image (strict prohibition of copying mark) illustrated in FIG. 9 are stored.

Subsequently, the user sets control information corresponding to each registered image through the control panel unit 5. For example, the display unit 51 displays a list of setting information associating the registered image with each item of the control information.

For example, when the user selects the item of the image storage of the control information corresponding to any one of the first registered image, the second registered image, the third registered image and the fourth registered image through the input unit 52, the display unit 51 pull-down-displays a plurality of candidates such as "detected page deletion", "detected page extraction" and "all-job storage prohibition or all-job copy prohibition". Subsequently, the user may select one candidate from the pull-down display through the input unit 52.

In addition, the item of the "detected page deletion" designates non-storability of the image data corresponding to the detected page and designates storage of the image corresponding to the page other than the detected page. The item of the "detected page extraction" designates storage of the image data corresponding to the detected page and designates non-storability of the image corresponding to the page other than the detected page. The item of the "all-job storage prohibition or all-job copy prohibition" prohibits storage or copying of the book reading image data (front cover data and opened page data) acquired by the book original scan mode (book original scan job).

Similarly, when the user selects the item of display of the detected page for warning or confirmation of the control information corresponding to any one of the first registered image, the second registered image, the third registered image and the fourth registered image through the input unit 52, the display unit 51 pull-down-displays a plurality of candidates such as valid (ON) and invalid (OFF). Subsequently, the user may select one candidate from the pull-down display through the input unit 52.

Similarly, when the user selects the item of detected page deletion of the control information corresponding to any one of the first registered image, the second registered image, the third registered image and the fourth registered image through the input unit 52, the display unit 51 pull-down-displays a plurality of candidates such as valid (ON) and invalid (OFF). Subsequently, the user may select one candidate from the pull-down display through the input unit 52.

In addition, when detected page deletion is selected in the item of the image storage, the item of detected image erasing cannot be selected. Similarly, even when all-job storage prohibition or all-job copy prohibition is selected in the item of the image storage, the item of detected image erasing cannot be selected.

The control panel unit 5 receives designation of each item of the control information corresponding to the registered image in response to selection of the item through the input unit 52 and display of the item by the display unit 51 (ACT 109) and sets setting information associating the registered image with the control information (ACT 110). Therefore, the processor 41 stores the setting information associating the registered image with the control information in the setting information management unit 7.

By repeating ACT 109 and ACT 110 until setting of the setting information is finished (ACT 111, NO), for example, the setting information illustrated in FIG. 9 is set.

Figure 5:
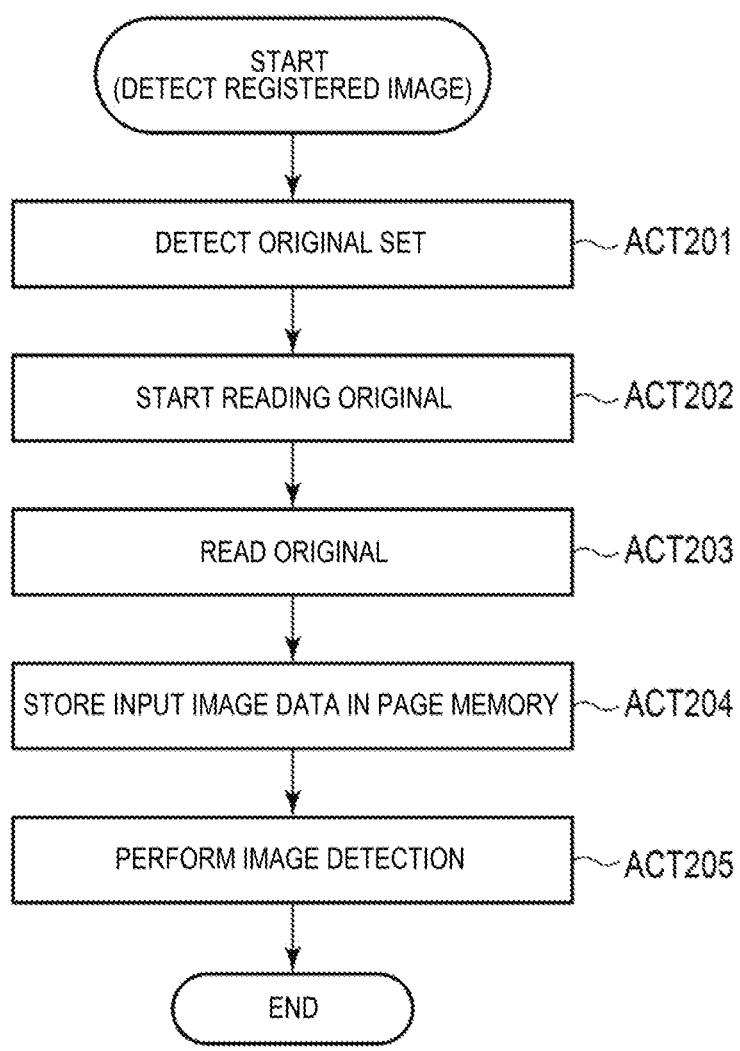
FIG. 5 is a flowchart illustrating an example of a detecting a registered image.

FIG. 5 is a flowchart illustrating an example of detecting the registered image (ACT 2 of FIG. 3).

When scanning, the user sets an original on the original platen or the ADF. Then, the scanning unit 1 detects an original set (ACT 201). The user touches a scan button displayed on the display unit 51 of the control panel unit 5. The input unit 52 of the control panel unit 5 detects touch of the scan button, and the processor 41 starts reading of the original image by the scanning unit 1 based on detection of touch of the scan button (ACT 202). The scanning unit 1 reads by carriage scanning (ACT 203) and outputs input image data corresponding to the original image.

The image processing unit 2 stores the input image data output from the scanning unit 1 in the page memory 42 (ACT 204). The processor 41 reads the input image data stored in the page memory 42 and detects an image with respect to the input image data based on all registered images included in the setting information illustrated in FIG. 9 (ACT 205). Input image data corresponding to one page of the original includes image data (first image data) corresponding to one page. Input image data corresponding to a plurality of pages of the original includes image data (first image data, second image data, . . . , and N-th image data) corresponding to a plurality of pages (N pages). The processor 41 detects the image with respect to image data of all pages included in the image input data. For example, the processor 41 detects an image region having similarity having a reference value or more with respect to the registered image from the image data of all pages based on image feature amounts of the registered image. In addition, similarity may be determined by excluding the concept of the size of the registered image or by setting the upper and lower limits with a certain ratio of the size of the registered image.

Figure 6:
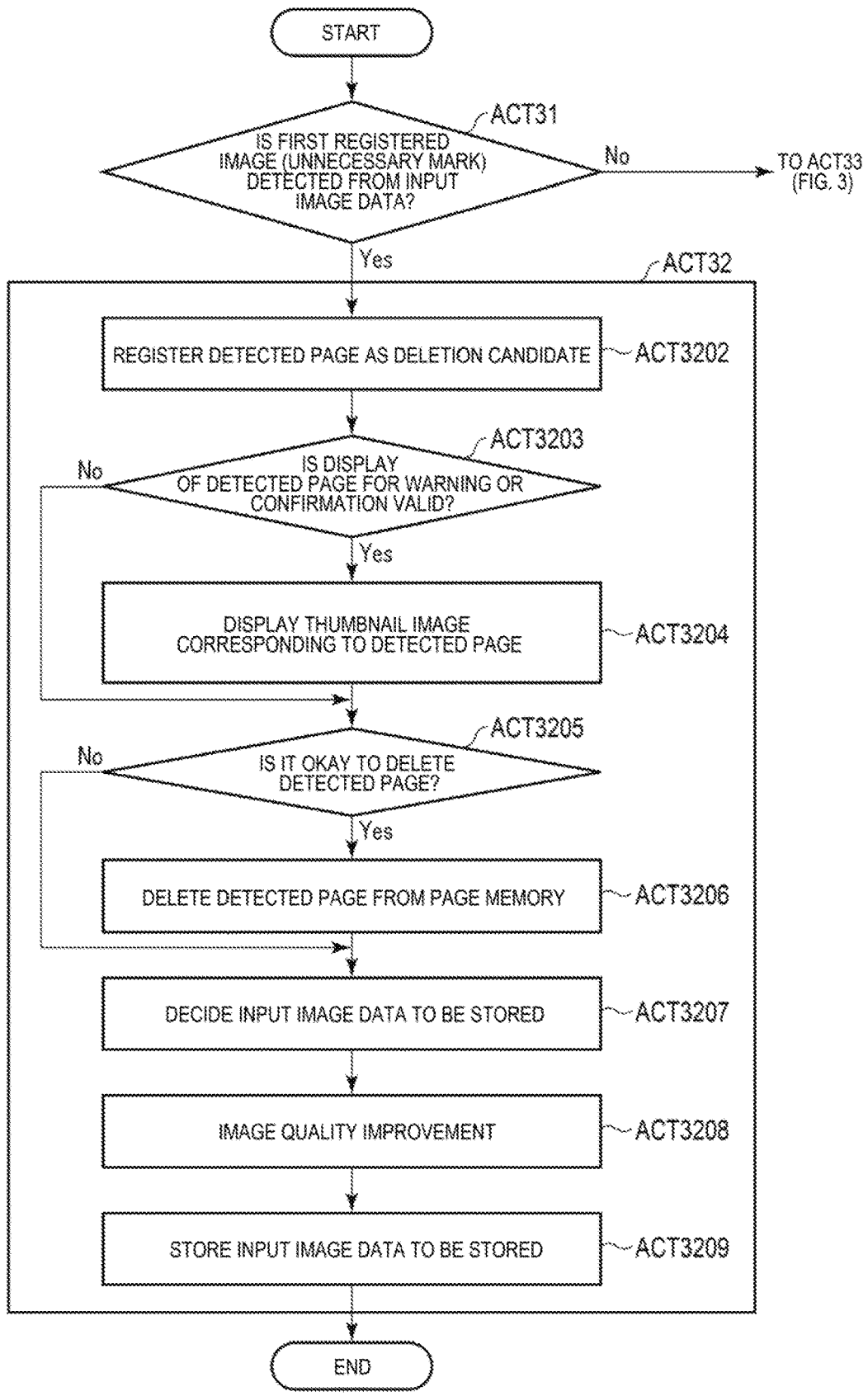
FIG. 6 is a flowchart illustrating an example of first image storage control.

FIG. 6 is a flowchart illustrating an example of first image storage control (ACT 32 of FIG. 3).

When a first registered image is detected from the input image data stored in the page memory 42 (for example, first page image data included in the input image data) (ACT 31 of FIG. 3, YES), the processor 41 performs first image storage control based on first setting information associating the first registered image with first control information (ACT 32 of FIG. 3). When the first registered image is not detected from the input image data (ACT 31 of FIG. 3, NO), whether a second or third registered image is detected is determined (ACT 33 of FIG. 3).

When the first image storage control is performed, the processor 41 registers first page image data (hereinafter, referred to as a "detected page") including the first registered image, which is included in the input image data, as a deletion candidate and registers the page other than the detected page (for example, second page image data included in the input image data) as a storage candidate (ACT 3202). When display of detected page for warning or confirmation included in the first setting information is valid (ON) (ACT 3203, YES), the processor 41 instructs display of the image corresponding to the detected page and the display unit 51 of the control panel unit 5 displays a thumbnail image, warning information, a confirmation button and a deletion cancel button corresponding to the detected page (ACT 3204). When display of detected page for warning or confirmation included in the first setting information is invalid (OFF) (ACT 3203, NO), the processor 41 omits display of the thumbnail image corresponding to the detected page.

When the user touches the confirmation button displayed on the display unit 51 of the control panel unit 5, the input unit 52 of the control panel unit 5 detects touch of the confirmation button and completes confirmation of deletion of the detected page (ACT 3205, YES). The processor 41 deletes the detected page from the page memory 42 (ACT 3206) based on completion of confirmation (ACT 3205, YES) and decides the input image data in the page memory 42 after deleting the detected page as an object to be stored (ACT 3207).

When the user touches the deletion cancel button displayed on the display unit 51 of the control panel unit 5, the input unit 52 of the control panel unit 5 detects touch of the deletion cancel button and cancels deletion of the detected page (ACT 3205, NO). The processor 41 does not delete the detected page from the page memory 42 based on cancel of deletion (ACT 3205, NO) and decides the input image data in the page memory 42 as an object to be stored (ACT 3207).

The processor 41 outputs the input image data in the page memory 42 to the image quality improving unit 22 and the image quality improving unit 22 improves image quality with respect to the input image data (ACT 3208). The processor 41 converts the input image data subjected to the image quality improvement into a predetermined file format and outputs output image data to the storing unit 43, and the storage unit 43 stores the output image data (ACT 3209).

By the above operation, substantially, the processor 41 does not store the detected page (the first page image data), from which the first registered image is detected, in the storage unit 43 and stores the page other than the detected page, from which the first registered image is not detected, (the first page image data) in the storage unit 43. When first image storage control is performed according to a copy mode, copy of the detected page is prohibited but the page other than the detected page is copied.

Figure 10A:
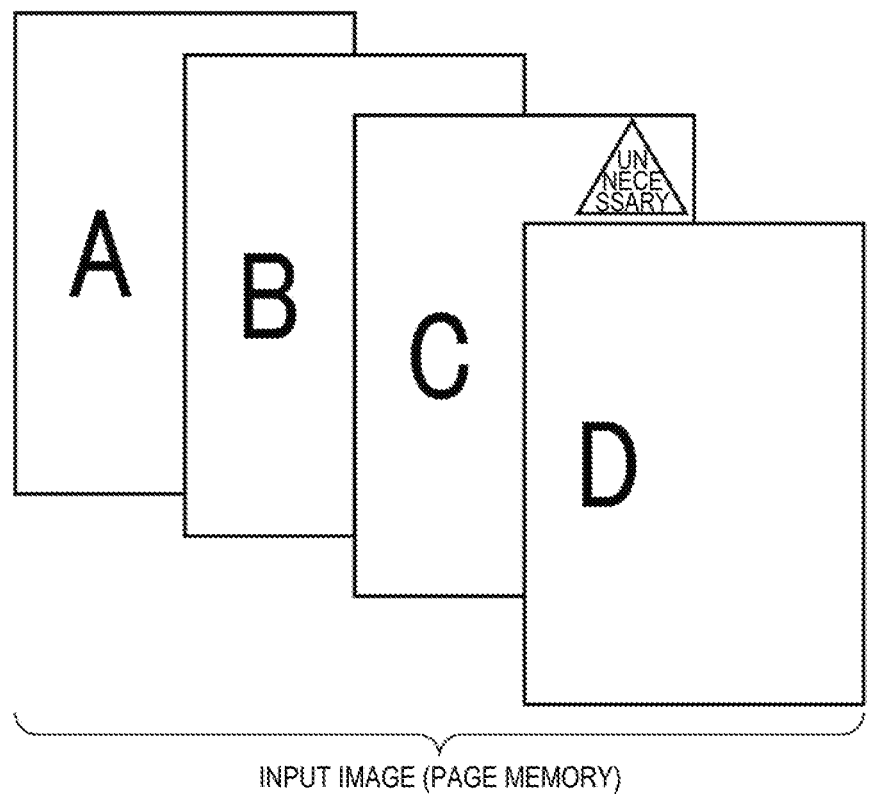
FIG. 10A is a diagram illustrating an example of an input original image corresponding to input image data stored in a page memory before first image storage control.
Figure 10B:
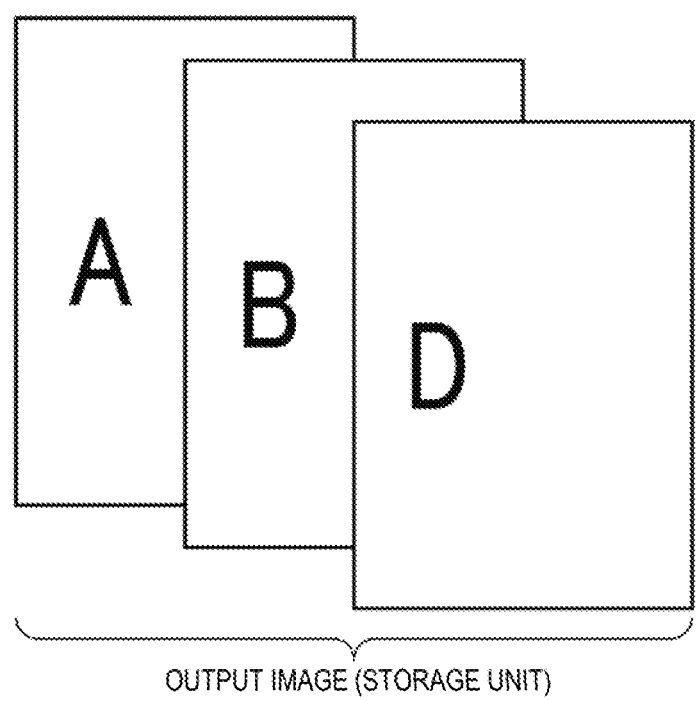
FIG. 10B is a diagram illustrating an example of an output original image corresponding to output image data stored in a storage unit after first image storage control.

Now, the image of the original before and after first image storage control will be described with reference to FIGS. 10A and 10B. FIG. 10A is a diagram illustrating an example of an input original image corresponding to input image data stored in the page memory 42 before first image storage control, and FIG. 10B is a diagram illustrating an example of an output original image corresponding to output image data stored in the storage unit 43 after first image storage control.

Input image data corresponding to the input original images (FIG. 10A) of four pages of an original A, an original B, an original C and an original D is stored in the page memory 42. In addition, the original C includes a first registered image. The processor 41 detects the first registered image from the original C by referring to all registered image included in the setting information illustrated in FIG. 9, registers the image data (that is, the detected image) corresponding to the original C as the deletion candidate, and registers the image data corresponding to the original A, the original B and the original D as the storage candidate. In addition, the display unit 51 of the control panel unit 5 displays the thumbnail image of the detected page, warning information, a confirmation button and an additional scan button. The processor 41 detects the detected page from the page memory 42 based on detection of touch of the confirmation button. Therefore, the processor 41 stores the image data corresponding to three pages of the original A, the original B and the original D left in the page memory 42 in the storage unit 43 as output image data.

Figure 7:
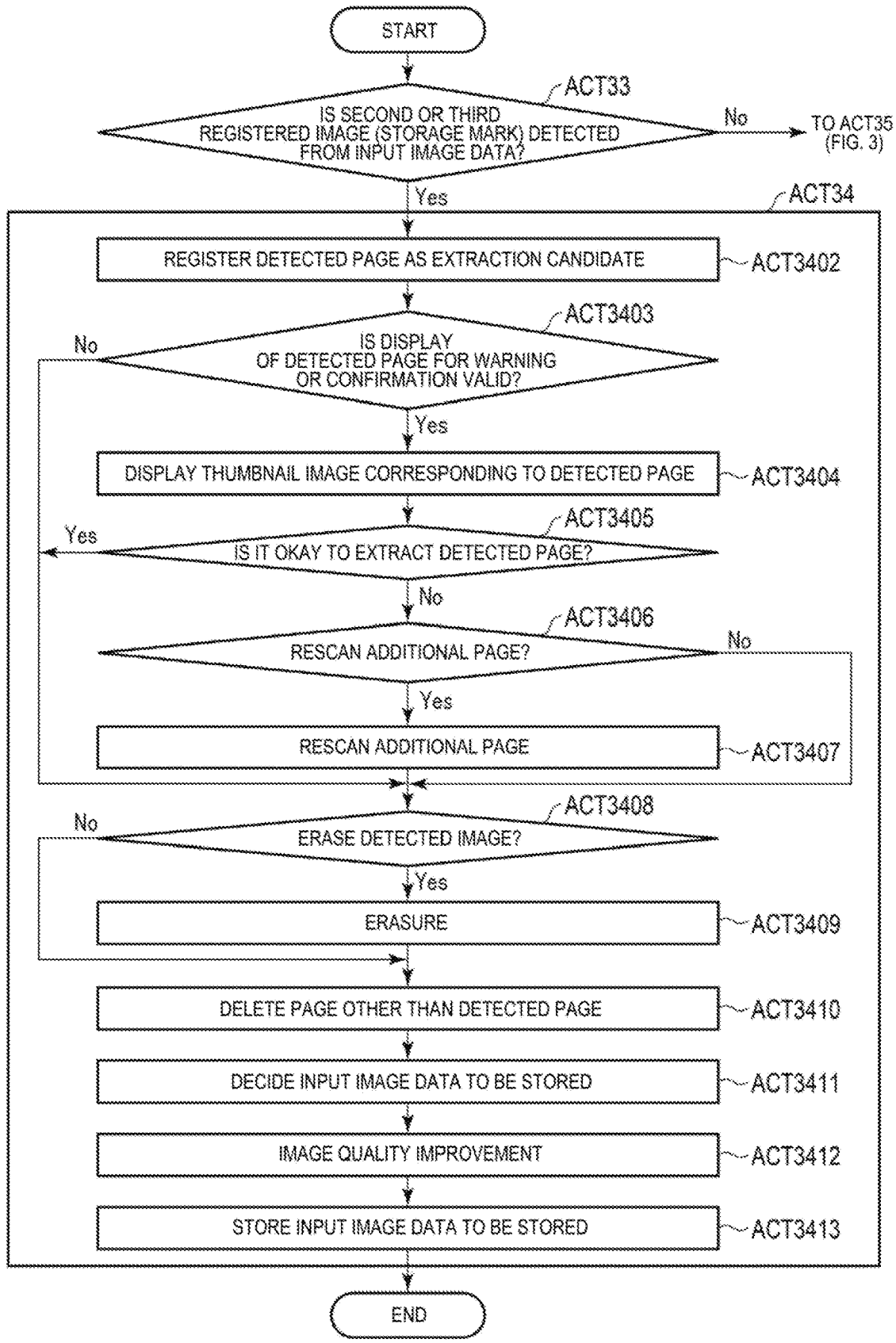
FIG. 7 is a flowchart illustrating an example of second image storage control.

FIG. 7 is a flowchart illustrating an example of second image storage control (ACT 34 of FIG. 3).

When the second registered image is detected from the input image data stored in the page memory 42 (for example, the first page image data included in the input image data) (ACT 33 of FIG. 3, YES), the processor 41 performs second image storage control based on second setting information associating the second registered image with the second control information (ACT 34 of FIG. 3). In addition, the detected second registered image is referred to as a "detected image". When the second or third registered image is not detected from the input image data (ACT 33 of FIG. 3, NO), whether the fourth registered image is detected is determined (ACT 35 of FIG. 3).

When second image storage control is performed, the processor 41 registers the first page image data including the second registered image (that is, the detected page) as an extraction candidate and registers the page other than the detected page (for example, the second page image data included in the input image data) as a deletion candidate (ACT 3402). When display of the detected page for warning or confirmation included in the second setting information is valid (ON) (ACT 3403, YES), the processor 41 instructs display of the image corresponding to the detected page and the display unit 51 of the control panel unit 5 displays the thumbnail image corresponding to the detected page, warning information, a confirmation button and an additional scan button (ACT 3404). When display of the detected page for warning or confirmation included in the second setting information is invalid (OFF) (ACT 3403, NO), the processor 41 omits display of the thumbnail image corresponding to the detected page.

When the user touches the additional scan button displayed on the display unit 51 of the control panel unit 5, the input unit 52 of the control panel unit 5 detects touch of the additional scan button and the processor 41 receives additional scan of the original (ACT 3406, YES). In this case, additional scan of the original is performed (ACT 3407 (ACT 201 to ACT 205)).

When the user touches the confirmation button displayed on the display unit 51 of the control panel unit 5, the input unit 52 of the control panel unit 5 detects touch of the confirmation button and completes confirmation of extraction of the detected page (ACT 3405, YES). Subsequently, when erasing of the detected image included in the second setting information is invalid (OFF) (ACT 3408, NO), the processor 41 does not erase the detected image.

The processor 41 deletes the page other than the detected page from the page memory 42 (ACT 3410) based on completion of confirmation (ACT 3405, YES) and decides the input image data in the page memory 42 after deleting the page other than the detected page as an object to be stored (ACT 3411).

The processor 41 outputs the input image data in the page memory 42 to the image quality improving unit 22 and the image quality improving unit 22 improves the image quality with respect to the input image data (ACT 3412). The processor 41 converts the input image data subjected to the image quality improvement into a predetermined file format and outputs output image data to the storing unit 43, and the storage unit 43 stores the output image data (ACT 3413).

By the above operation, substantially, the processor 41 stores the detected page (the first page image data), from which the second registered image is detected, in the storage unit 43 and does not store the page other than the detected page, from which the second registered image is not detected, (the second page image data) in the storage unit 43. When second image storage control is performed according to a copy mode, the detected page is copied but copy of the page other than the detected page is prohibited.

Figure 11A:
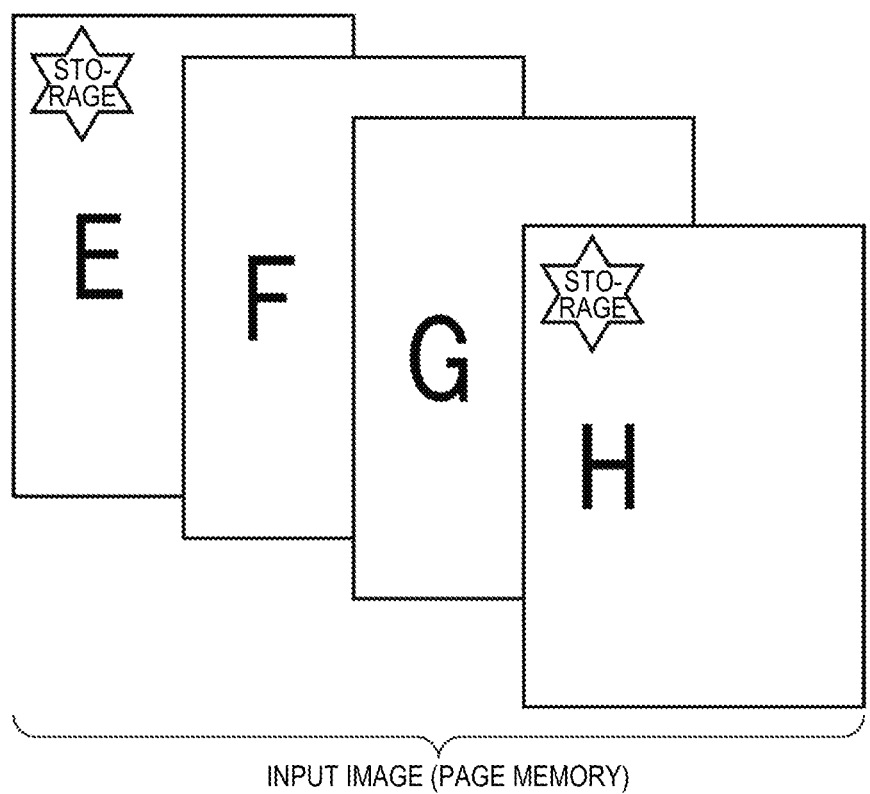
FIG. 11A is a diagram illustrating an example of an input original image corresponding to input image data stored in a page memory before second image storage control.
Figure 11B:
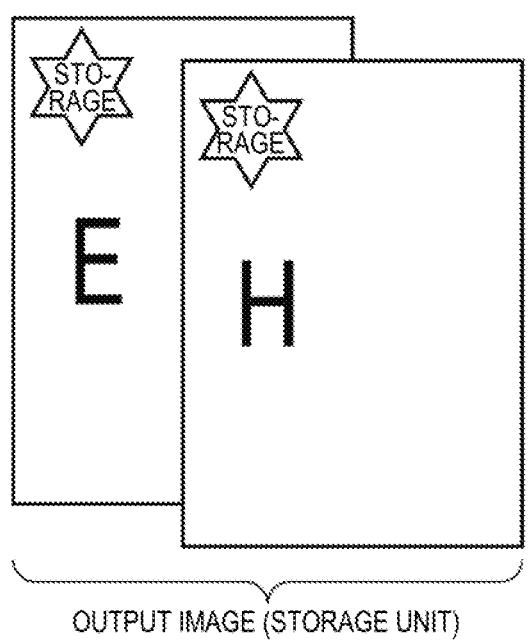
FIG. 11B is a diagram illustrating an example of an output original image corresponding to output image data stored in a storage unit after second image storage control.

Now, the image of the original before and after second image storage control will be described with reference to FIGS. 11A and 11B. FIG. 11A is a diagram illustrating an example of an input original image corresponding to input image data stored in the page memory 42 before second image storage control, and FIG. 11B is a diagram illustrating an example of an output original image corresponding to output image data stored in the storage unit 43 after second image storage control.

As illustrated in FIG. 11A, input image data corresponding to four pages of an original E, an original F, an original G and an original H is stored in the page memory 42. In addition, the original E and the original H include second registered images. The processor 41 detects the second registered images from the original E and the original H by referring to all registered image included in the setting information illustrated in FIG. 9, registers the image data (that is, the detected image) corresponding to the original E and the original H as the storage candidate, and registers the pages other than the detected pages as the deletion candidate. In addition, the display unit 51 of the control panel unit 5 displays the thumbnail images of the detected pages, warning information, a confirmation button and an additional scan button. The processor 41 deletes the pages other than the detected pages from the page memory 42 based on detection of touch of the confirmation button. Therefore, the processor 41 stores the image data corresponding to two pages of the original E and the original H left in the page memory 42 in the storage unit 43 as output image data.

Next, an example of third image storage control (ACT 34 of FIG. 3) according to the embodiment will be described with reference to FIG. 7. Third image storage control is basically equal to second image storage control except for some processes.

When the third registered image is detected from the input image data stored in the page memory 42 (for example, the first page image data included in the input image data) (ACT 33 of FIG. 3, YES), the processor 41 performs third image storage control based on third setting information associating the third registered image with the third control information (ACT 34 of FIG. 3).

When third image storage control is performed, the processor 41 registers the first page image data including the third registered image (that is, the detected page) as an extraction candidate and registers the page other than the detected page (for example, the second page image data included in the input image data) as a deletion candidate (ACT 3402). When display of the detected page for warning or confirmation included in the third setting information is valid (ON) (ACT 3403, YES), the processor 41 instructs display of the image corresponding to the detected page and the display unit 51 of the control panel unit 5 displays the thumbnail image corresponding to the detected page, warning information, a confirmation button and an additional scan button (ACT 3404). When display of the detected page for warning or confirmation included in the third setting information is invalid (OFF) (ACT 3403, NO), the processor 41 omits display of the thumbnail image corresponding to the detected page.

When the user touches the additional scan button displayed on the display unit 51 of the control panel unit 5, the input unit 52 of the control panel unit 5 detects touch of the additional scan button and the processor 41 receives additional scan of the original (ACT 3406, YES). In this case, additional scan of the original is performed (ACT 3407 (ACT 201 to ACT 205)).

When the user touches the confirmation button displayed on the display unit 51 of the control panel unit 5, the input unit 52 of the control panel unit 5 detects touch of the confirmation button and completes confirmation of extraction of the detected page (ACT 3405, YES). Subsequently, when erasing of the detected image included in the third setting information is valid (ON) (ACT 3408, YES), the processor 41 erases the detected image (ACT 3409). For example, the processor 41 covers the region of the detected image with the peripheral image of the region of the detected image and erases the image in the region of the detected image (image corresponding to the third registered image).

The processor 41 deletes the page other than the detected page from the page memory 42 (ACT 3410) based on completion of confirmation (ACT 3405, YES) and decides the input image data in the page memory 42 after deleting the page other than the detected page as an object to be stored (ACT 3411). In this case, the input image data in the page memory 42 is a detected page and the detected image in the detected page is erased.

The processor 41 outputs the input image data in the page memory 42 to the image quality improving unit 22 and the image quality improving unit 22 improves the image quality with respect to the input image data (ACT 3412). The processor 41 converts the input image data subjected to the image quality improvement into a predetermined file format and outputs output image data to the storing unit 43, and the storage unit 43 stores the output image data (ACT 3413).

By the above operation, substantially, the processor 41 erases the detected page (the first page image data) from the detected page, from which the third registered image is detected, and does not store the page other than the detected page, from which the third registered image is not detected, (the second page image data) in the storage unit 43. When third image storage control is performed according to a copy mode, the detected page without the detected image is copied but copy of the page other than the detected page is prohibited.

Figure 12A:
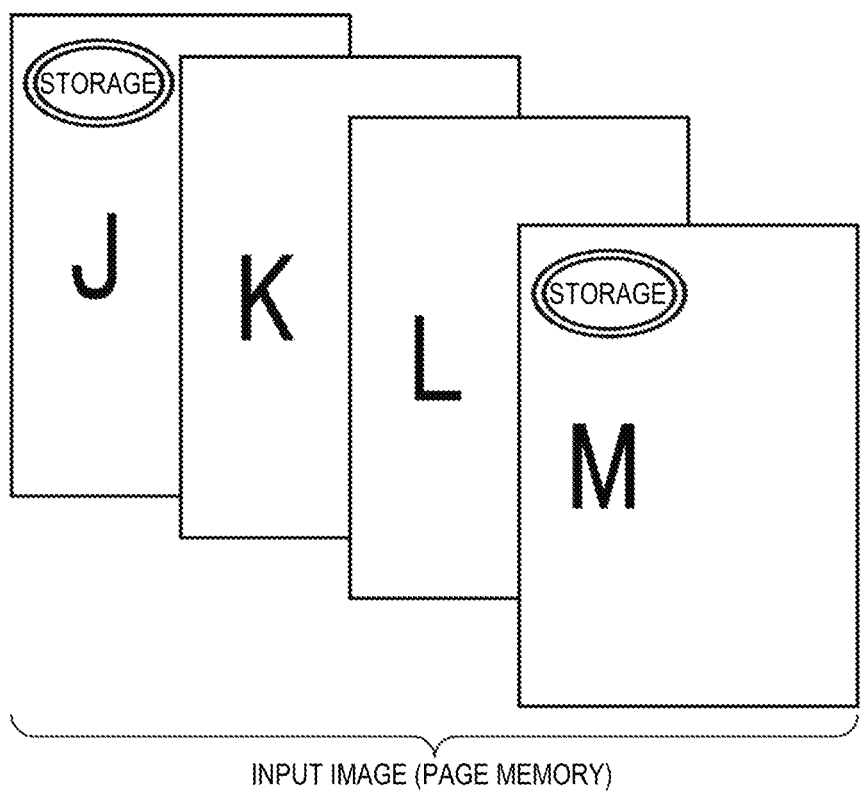
FIG. 12A is a diagram illustrating an example of an input original image corresponding to input image data stored in a page memory before third image storage control.
Figure 12B:
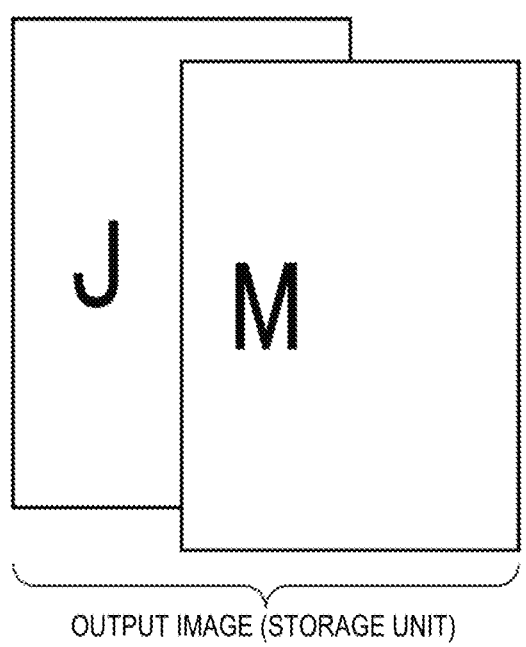
FIG. 12B is a diagram illustrating an example of an output original image corresponding to output image data stored in a storage unit after third image storage control.

Now, the image of the original before and after third image storage control will be described with reference to FIGS. 12A and 12B. FIG. 12A is a diagram illustrating an example of an input original image corresponding to input image data stored in the page memory 42 before third image storage control, and FIG. 12B is a diagram illustrating an example of an output original image corresponding to output image data stored in the storage unit 43 after third image storage control.

As illustrated in FIG. 12A, input image data corresponding to four pages of an original J, an original K, an original L and an original M are stored in the page memory 42. In addition, the original J and the original M include third registered images. The processor 41 detects the third registered images from the original J and the original M by referring to all registered image included in the setting information illustrated in FIG. 9, registers the image data (that is, the detected image) corresponding to the original J and the original M as the storage candidate, and registers the pages other than the detected pages as the deletion candidate. In addition, the display unit 51 of the control panel unit 5 displays the thumbnail images of the detected pages, warning information, a confirmation button and an additional scan button. The processor 41 deletes the pages other than the detected pages from the page memory 42 based on detection of touch of the confirmation button. Therefore, the processor 41 stores the image data corresponding to two pages of the original J and the original M left in the page memory 42 in the storage unit 43 as output image data.

Figure 8:
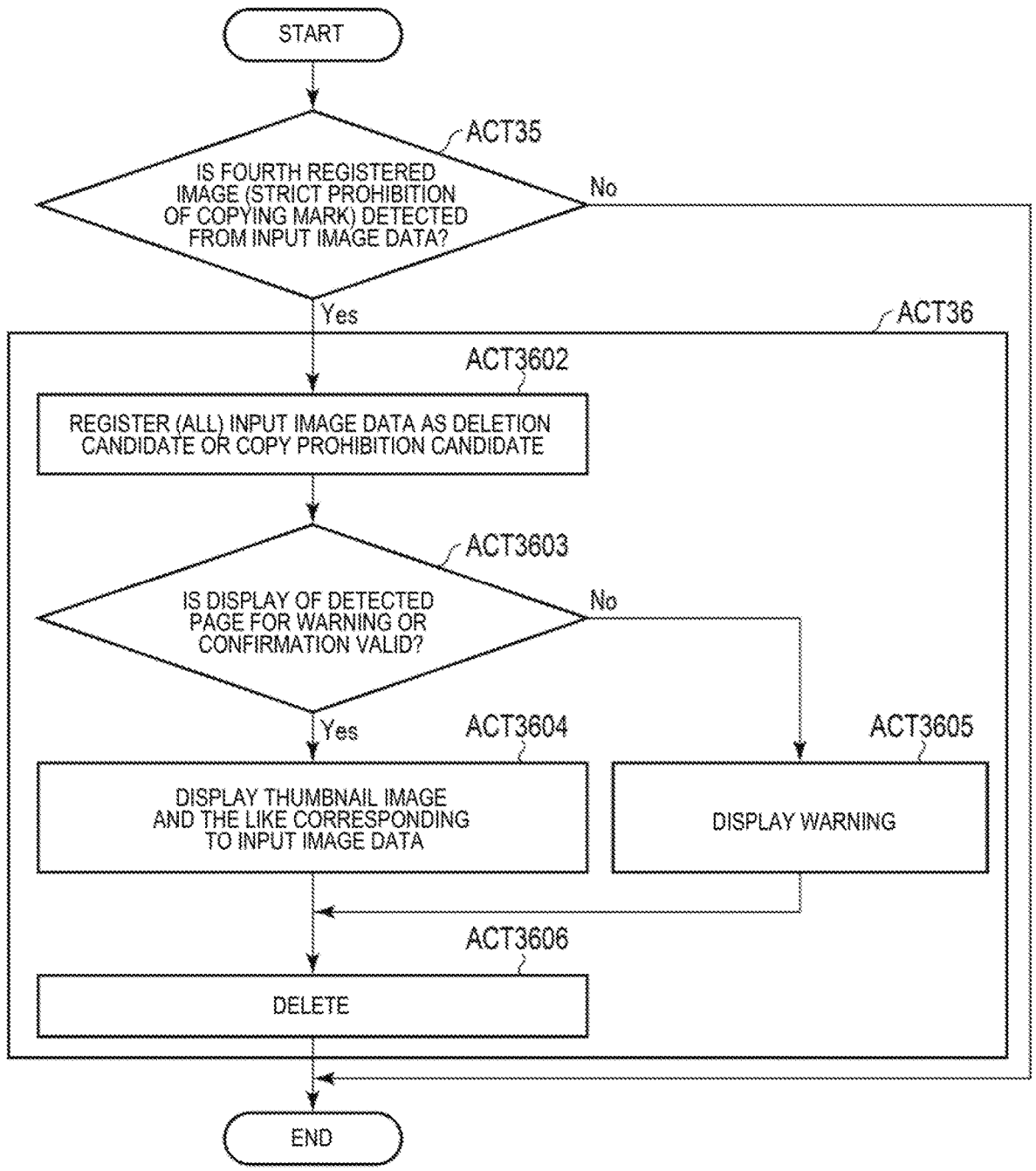
FIG. 8 is a flowchart illustrating an example of fourth image storage control.

FIG. 8 is a flowchart illustrating an example of fourth image storage control (ACT 36 of FIG. 3).

When the fourth registered image is detected from the input image data stored in the page memory 42 (for example, the page image data corresponding to at least one of the plurality of pages included in the input image data) (ACT 35 of FIG. 3, YES), the processor 41 performs fourth image storage control based on fourth setting information associating the fourth registered image with the fourth control information (ACT 36 of FIG. 3). When the fourth registered image is not detected from the input image data (ACT 35 of FIG. 3, NO), the process is finished.

When fourth image storage control is performed, the processor 41 registers the input image data (all-page image data included in the input image data) as a deletion candidate or a copy prohibition candidate (ACT 3602). When display of the detected page for warning or confirmation included in the fourth setting information is valid (ON) (ACT 3603, YES), the processor 41 instructs display of the image corresponding to the detected page and the display unit 51 of the control panel unit 5 displays the thumbnail image corresponding to the detected page, warning information (storage prohibition or copy prohibition guide), or the like (ACT 3604). When display of the detected page for warning or confirmation included in the fourth setting information is invalid (OFF) (ACT 3603, NO), the detected page and the display unit 51 of the control panel unit 5 does not display the thumbnail image corresponding to the detected page and displays warning information (storage prohibition or copy prohibition guide) (ACT 3605).

Subsequently, the processor 41 deletes the input image data from the page memory 42 (ACT 3606).

By the above operation, the processor 41 does not store the input image data, from which the fourth registered image is detected, in the storage unit 43 and prohibits copy.

Figure 13:
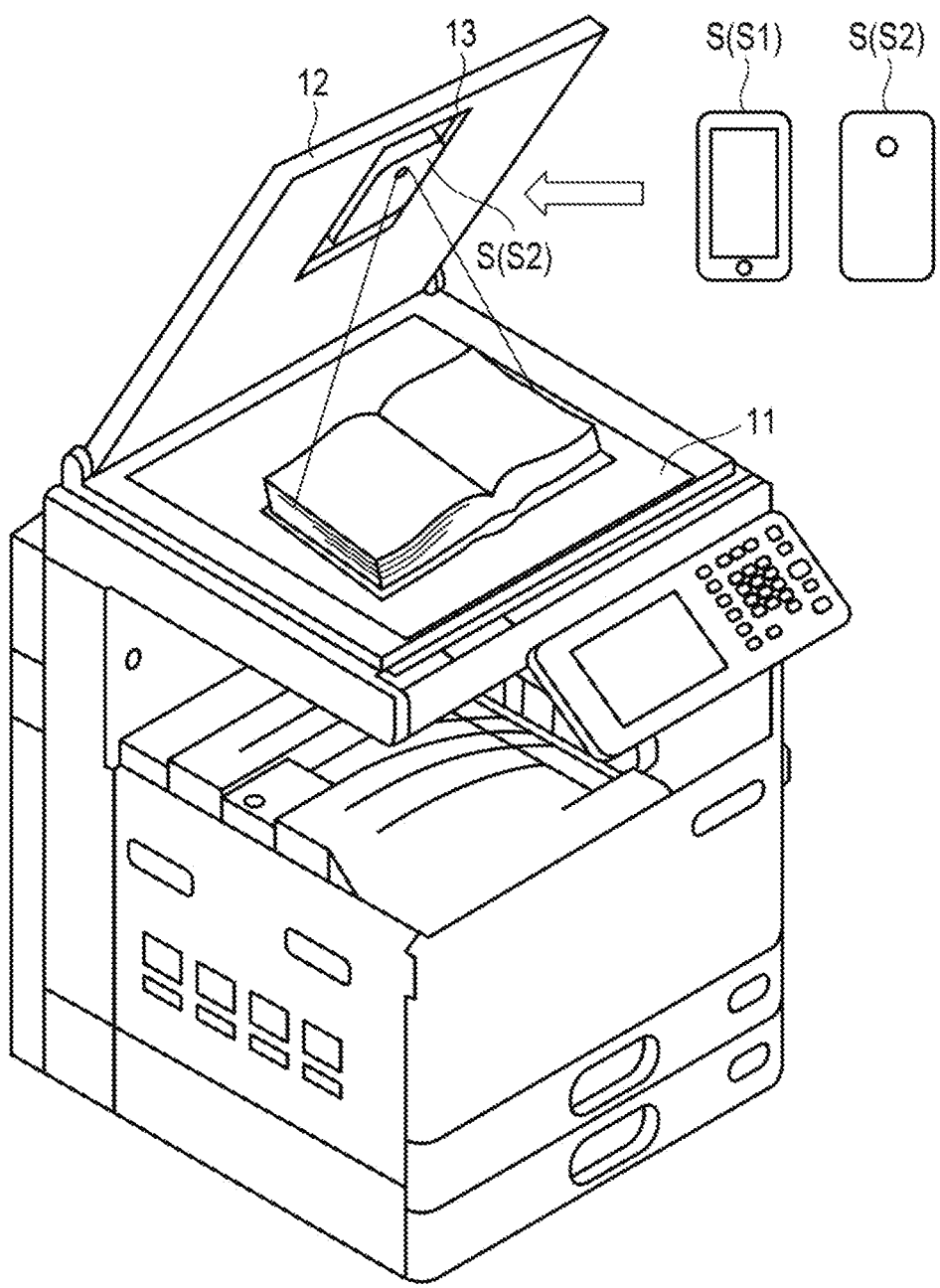
FIG. 13 is a diagram illustrating the appearance of an example of the image forming apparatus.

FIG. 13 is a diagram illustrating the appearance of an example of the image forming apparatus. The schematic configuration of this image forming apparatus was described with reference to FIGS. 1 and 2.

As illustrated in FIG. 13, the image forming apparatus includes an original platen 11, an original platen cover 12, and a camera holding unit 13. For example, the camera holding unit 13 is installed at the center of the original platen cover 12. The camera holding unit 13 holds a smartphone (camera) S installed by the user. The user attaches the smartphone S such that the front surface 51 of the smartphone S faces the original platen cover 12 or the back surface (a surface including a camera lens) S2 of the smartphone S faces the original platen 11. Therefore, the camera lens of the smartphone S installed on the original platen cover 12 faces the original platen 11 in a state of closing the original platen cover 12.

In order to perform the book original scan mode, the user places the opened book on the original platen 11. At this time, the book is placed on the original platen 11 in a state in which the front surface, the back surface or the rear surface of the book faces the original platen 11. In addition, the image forming apparatus transmits a camera photographing instruction to the smartphone S by wireless communication and receives image data from the smartphone S.

When the book original scan mode is designated through the control panel unit 5 of the image forming apparatus to touch the scan button, the scanning unit 1 of the image forming apparatus starts scanning by carriage scanning and acquires book reading image data (front cover data) by carriage scanning. In addition, the scan button synchronizes with touch to transmit the camera photographing instruction to the smartphone S through wireless communication. Therefore, the smartphone S starts camera photographing and transmits the photographed book reading image data (opened page data) to the image forming apparatus. The page memory 42 of the image forming apparatus stores the book reading image data (front page data) acquired by carriage scanning and the book reading image data (opened page data) acquired by camera photographing of the smartphone S in association with each other.

Figure 14:
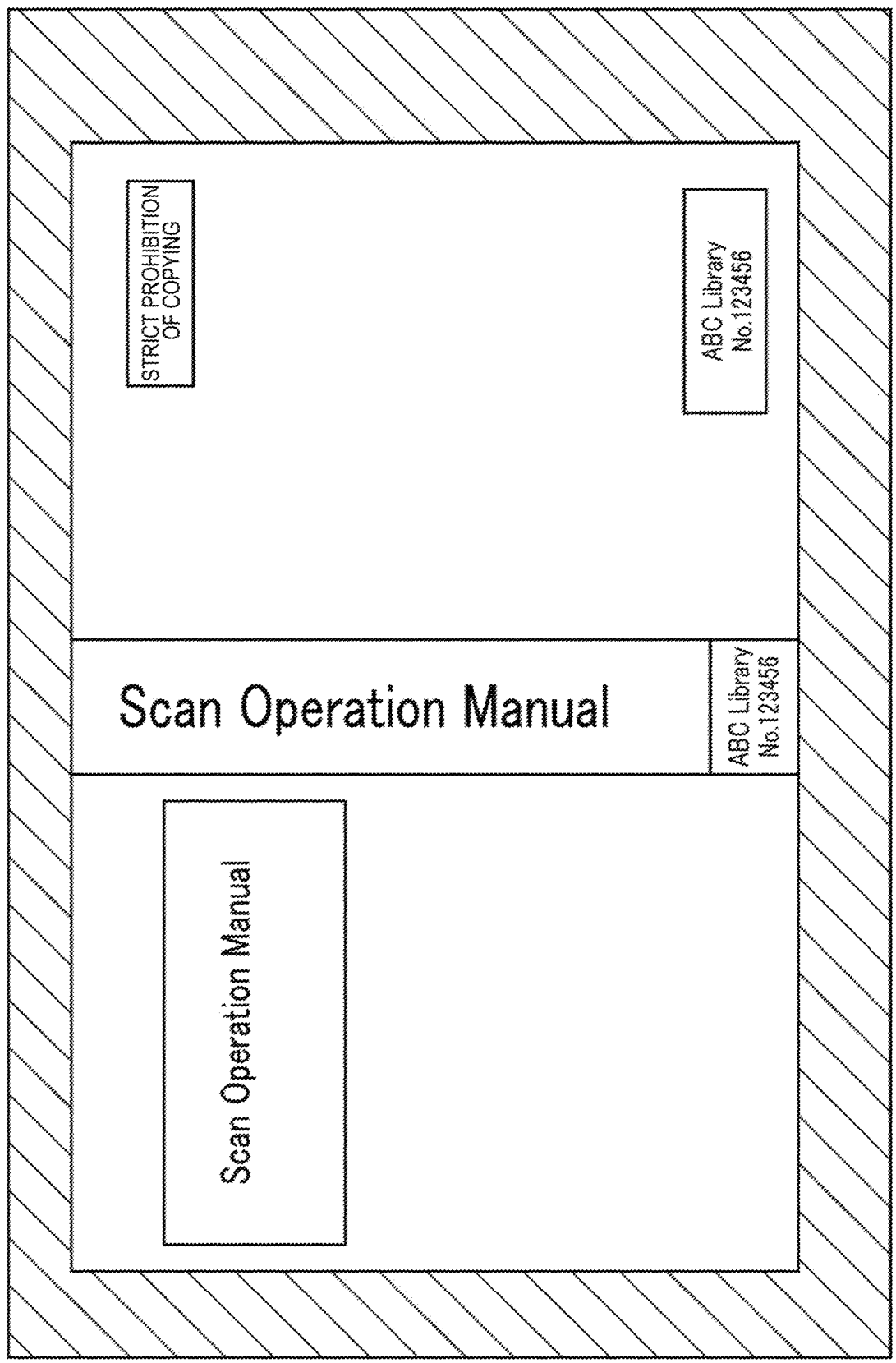
FIG. 14 is a diagram illustrating an example of book reading image data (front cover data) acquired by carriage scanning.

FIG. 14 is a diagram illustrating an example of book reading image data (front cover data) acquired by carriage scanning of the image forming apparatus illustrated in FIG. 13. As illustrated in FIG. 14, the front cover data includes a front surface (including an image of "Scan Operation Manual") a back surface (including an image of "Scan Operation Manual" and "ABC Library No. 123456" and a rear surface (including an image of "strict prohibition of copying" and "ABC Library No. 123456").

Figure 15A:
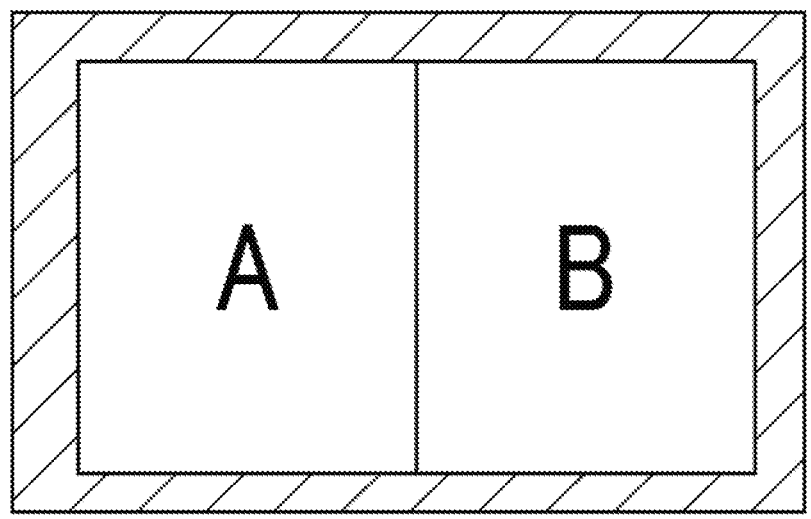
FIG. 15A is a diagram illustrating an example of book reading image data (opened page data) photographed by a smartphone installed in the image forming apparatus.
Figure 15B:
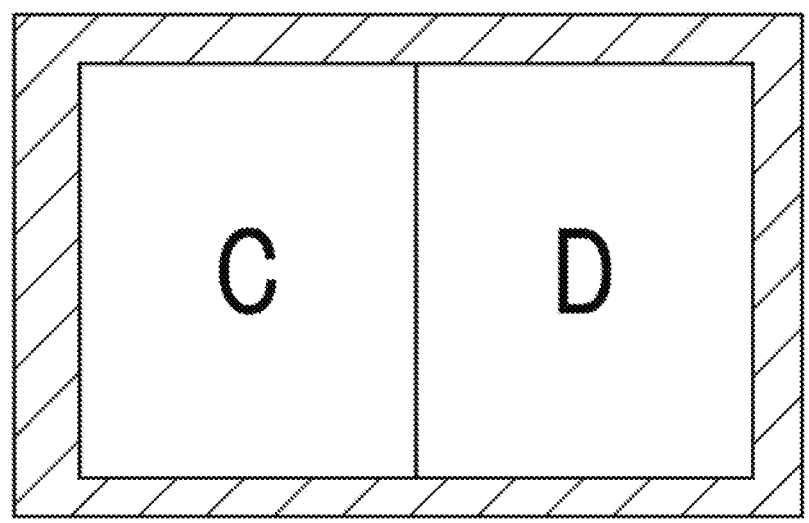
FIG. 15B is a diagram illustrating an example of book reading image data (opened page data) photographed by a smartphone installed in the image forming apparatus.

FIGS. 15A and 15B are diagrams illustrating an example of book reading image data (opened page data) photographed by a smartphone S installed in the image forming apparatus illustrated in FIG. 13. As illustrated in FIG. 15A, the opened page data includes images A and B on the left and right. As illustrated in FIG. 15B, the opened page data includes images C and D on the left and right.

Figure 16:
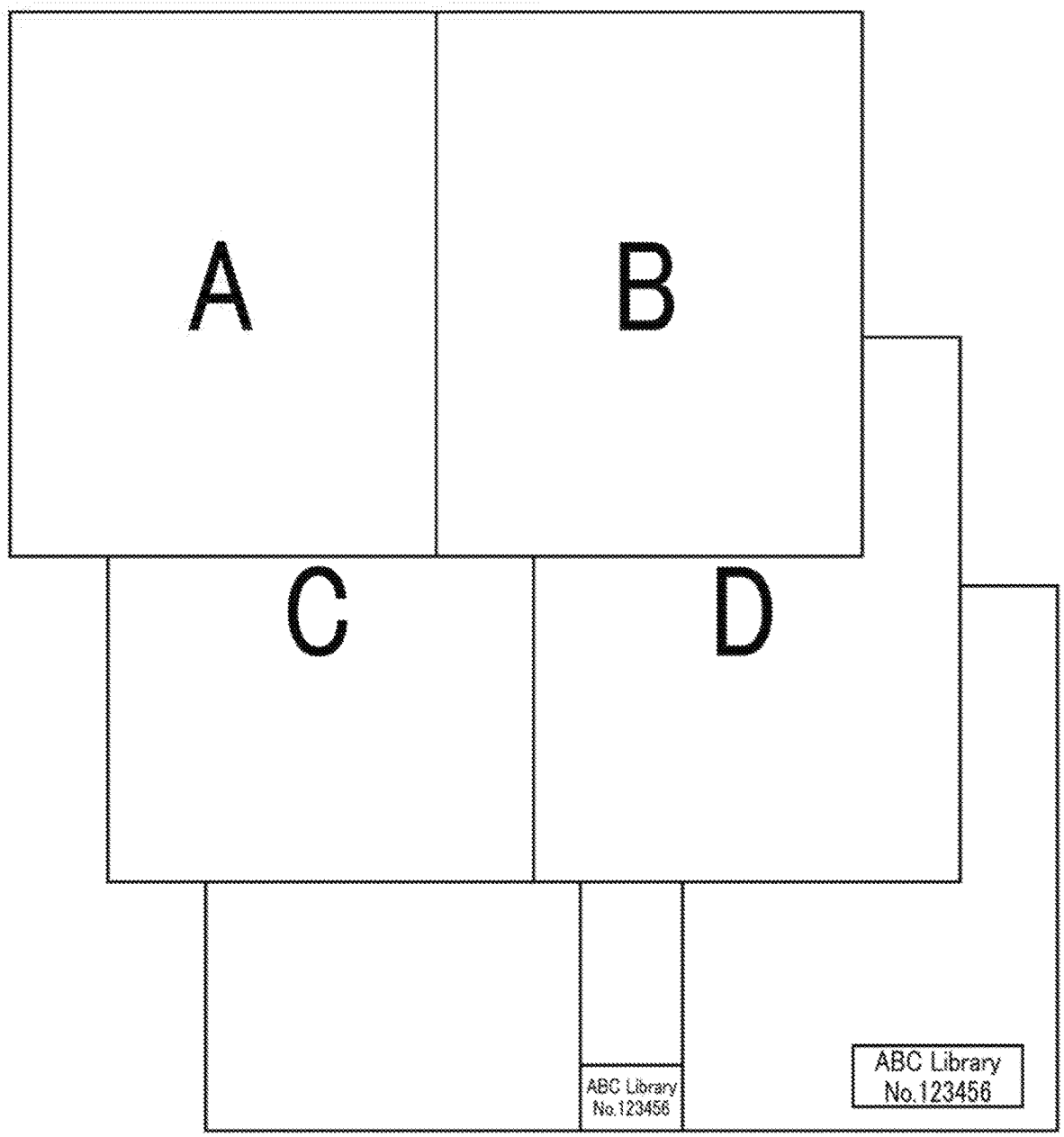
FIG. 16 is a diagram illustrating an example of book reading image data (front cover data and opened page data) acquired by a book original scan mode.

FIG. 16 is a diagram illustrating an example of book reading image data (front cover data and opened page data) acquired by the book original scan mode. For example, in response to execution of the book original scan mode, the page memory 42 stores the front cover image and the opened page data illustrated in FIG. 16.

The processor 41 detects the fourth registered image from the input image data stored in the page memory 42 and performs fourth image storage control based on the fourth setting information associating the fourth registered image with the fourth control information. For example, the display unit 51 of the control panel unit 5 displays the thumbnail image illustrated in FIG. 14 and displays the warning information (storage prohibition or copy prohibition guide) and then the processor 41 deletes the front cover data and the opened page data stored in the page memory 42. In addition, the processor 41 may stop scan operation of the opened page and delete the front cover page and the opened page data stored in the page memory 42, when the fourth registered image is detected.

FIG. 17 is a diagram illustrating an example of storage information acquired by a book original scan mode. For example, when the book original scan mode is executed and the fourth registered image is not detected from the input image data stored in the page memory 42, the processor 41 recognizes character information from the image data acquired in the book original scan mode and generates the result of recognition as book related information (FIG. 17). In addition, the processor 41 stores book data associating the image data acquired in the book original scan mode with the book related information in the storage unit 43.

In the above description, the case where image storage control according to the detected registered image was described on the assumption that any one of four kinds of registered images (first, second, third and fourth registered images) is detected from the input image data. For example, when a plurality of kinds of registered images is detected from the input image data, the control panel unit 5 may display warning and prompt the user to rescan the original.

Alternatively, when the second and third registered images are detected from the input image data, second and third image storage control may be performed. For example, when the second registered image (storage mark) is detected from the first page image data included in the input image data and the third registered image (storage mark) is detected from the second page image data, since erasing of the detected image is set to be invalid (OFF) in response to the second registered image, the first page image data including the second registered image is stored without change and, since erasing of the detected image is set to be valid (ON) in response to the third registered image, the third page image data is stored after the third registered image is erased with respect to the second page image data including the third registered image and the other page image data is deleted.

According to the image forming apparatus of the present embodiment, it is possible to set setting associating the registered image desired by the user with the control information and to control whether the page image including the registered image (the region of the registered image) is stored or not and control whether the page image data without the registered image (the region of the registered image) is stored or not, based on the setting information. That is, according to the image forming apparatus of the present embodiment, it is possible to switch image storage control of the input image data based on the setting information associating the registered image desired by the user with the control information.

In addition, the user can simply set the setting information associating the desired registered image with the control information by the control panel unit 5. The control panel unit 5 registers a plurality of registered images (unnecessary mark, storage mark and strict prohibition of copying mark) by the image registration mode, displays the plurality of registered images, and displays control information associated with the registered images. In addition, the control panel unit 5 simplifies settings of each item of the control information as a selection type by displaying setting of each item of the control information in a pull-down form.

According to first image storage control (in which the detected image, from which the first registered image (unnecessary mark) is detected, is deleted and the page other than the detected page is stored) illustrated in FIG. 6, it is possible to perform control focusing on storage prohibition or copy prohibition. For example, the user prepares a stamp using an erasable ink or a seal corresponding to the first registered image. The user prepares an original attached with the seal corresponding to the first registered image or an original, on which the stamp is pushed, sets such an original on the original platen, and completes setting of the first registered image by original scan. Thereafter, the user can prevent an original to be storage-prohibited or copy-prohibited from being stored or copied by attaching the seal to or pressing the stamp on the original to be storage-prohibited or copy-prohibited. In addition, the original to be storage-prohibited or copy-prohibited and the original which is not processed by the seal or stamp are mixed and treated. That is, when the image forming apparatus reads mixed originals, storage prohibition or copy prohibition is applied to the original to be storage-prohibited or copy-prohibited and storage or copy is applied to the original which is not processed.

In addition, it is possible to set display of the detected page for warning or confirmation to be valid (ON) or invalid (OFF) with respect to first image storage control and to prevent storage or copy undesired by the user by setting display of the detected page for warning or confirmation to be valid.

In addition, according to second image storage control (in which the detected image, from which the second registered image (storage mark) is detected, is stored and the page other than the detected page is deleted) illustrated in FIG. 7, it is possible to perform control focusing on storage or copy. For example, the user prepares a stamp using an erasable ink or a seal corresponding to the second registered image. The user prepares an original attached with the seal corresponding to the second registered image or an original, on which the stamp is pushed, sets such an original on the original platen, and completes setting of the second registered image by original scan. Thereafter, the user can prevent an original to be stored or copied from being stored or copied by attaching the seal to or pressing the stamp on the original to be stored or copied. In addition, the original to be stored or copied and the original which is not processed by the seal or stamp are mixed and treated. That is, when the image forming apparatus reads mixed originals, storage or copy is applied to the original to be stored or copied and storage prohibition or copy prohibition is applied to the original which is not processed.

In addition, it is possible to set display of the detected page for warning or confirmation to be valid (ON) or invalid (OFF) with respect to second image storage control and to prevent storage or copy undesired by the user by setting display of the detected page for warning or confirmation to be valid.

In addition, according to third image storage control (in which the detected page is stored after the registered image is erased from the detected page, from which the third registered image (storage mark) is detected, and the page other than the detected page is deleted) illustrated in FIG. 7, it is possible to erase the third registered image (storage mark), which is not originally necessary, from the detected page.

In addition, according to fourth image storage control (in which all the input image data, from which the fourth registered image (strict prohibition of copying mark) is detected, is deleted and copy is prohibited) illustrated in FIG. 8, it is possible to control storage or copy of all the image data of the book from some information of the front cover of the book. For example, in a book, there are many cases where information such as strict prohibition of copying is recorded on a front cover or the like. In such cases, it is possible to prevent scan data related to the contents of the book from being stored or copied.

In addition, it is possible to set display of the detected page for warning or confirmation to be valid (ON) or invalid (OFF) with respect to fourth image storage control and to prevent storage or copy undesired by the user by setting display of the detected page for warning or confirmation to be valid.

What is claimed is:

1. An information processing apparatus comprising:
a control panel configured to set setting information associating a registered image, which is obtained by reading an image, with control information indicating whether input image data is stored or not; and
a system processor configured to
detect the registered image from the input image data; and
control whether or not to store the input image data including the registered image in a storage based on the setting information.

2. The apparatus according to claim 1, wherein
the control panel is configured to set first setting information associating a first registered image with first control information indicating that image data is not storable, and
the system processor is configured to not store first page image data in the storage based on the first setting information and detection of the first registered image from first page image data included in the input image data.

3. The apparatus according to claim 2, wherein
the system processor is configured to store second page image data in the storage based on the first setting information and non-detection of the first registered image from the second page image data included in the input image data.

4. The apparatus according to claim 1, wherein
the control panel is configured to set second setting information associating a second registered image with second control information indicating that image data is stored, and
the system processor is configured to store first page image data in the storage based on the second setting information and detection of the second registered image from first page image data included in the input image data.

5. The apparatus according to claim 4, wherein
the system processor is configured to not store second page image data in the storage based on the second setting information and non-detection of the second registered image from the second page image data included in the input image data.

6. The apparatus according to claim 1, wherein
the control panel is configured to set third setting information associating a third registered image with third control information including an image data storage instruction and a deletion instruction of the third registered image, and
the system processor is configured to erase the third registered image included in first page image data and to store the first page image data, from which the third registered image is erased, in the storage, based on the third setting information and detection of the third registered image from the first page image data included in the input image data.

7. The apparatus according to claim 1, wherein
the control panel is configured to set fourth setting information associating a fourth registered image with fourth control information indicating image data storage prohibition or image data copy prohibition, and
the system processor is configured to not store or copy the input image data, based on the fourth setting information and detection of the fourth registered image from page image data corresponding to at least one of a plurality of pages included in the input image data.

8. The apparatus according to claim 7, wherein
the input image data includes front cover image data corresponding to a front surface, a back surface and a rear surface acquired by a book original scan, and
the system processor is configured to not store or copy the input image data based on the fourth setting information and detection of the fourth registered image from the front cover image data.

9. The apparatus according to claim 1, wherein
the control panel is configured to display the registered image and the control information to be associated with each other.

10. The apparatus according to claim 9, wherein
the control panel is configured to extract and set the registered image from original image data read from an original including the registered image.

11. The apparatus according to claim 1, wherein the control panel is configured to prompt a user to set the control information.

12. The apparatus according to claim 11, wherein the control panel includes a confirmation button prompting the user to confirm an operation to be performed by the system processor.

13. The apparatus according to claim 11, wherein when the system processor detects a plurality of kinds of registered images from the input date, the control panel prompts a user to rescan an original to provide new image data.

14. A method of operating an information processing apparatus including a processor and a storage, comprising:
setting, by a control panel of the information processing apparatus, information associating a registered image, which is obtained by reading an image, with control information indicating whether input image data is to be stored in the storage or not;
detecting, by the processor, the registered image from the input image data; and
controlling, by the processor, whether or not to store the input image data including the registered image in the storage based on the setting information.

15. The method according to claim 14, wherein
the setting includes setting first setting information associating a first registered image with first control information indicating that image data is not storable, and
wherein the method further comprises not storing first page image data in the storage based on the first setting information and detection of the first registered image from first page image data included in the input image data.

16. The method according to claim 15, wherein
storing second page image data in the storage is based on the first setting information and non-detection of the first registered image from the second page image data included in the input image data.

17. The method according to claim 14, wherein
the setting includes setting second setting information associating a second registered image with second control information indicating that image data is stored, and
wherein the method further comprises storing first page image data in the storage based on the second setting information and detection of the second registered image from first page image data included in the input image data.

18. The method according to claim 17, further comprising not storing second page image data in the storage based on the second setting information and non-detection of the second registered image from the second page image data included in the input image data.

19. The method according to claim 14, wherein
the setting includes setting third setting information associating a third registered image with third control information including an image data storage instruction and a deletion instruction of the third registered image, and
wherein the method further comprises erasing, by the processor, the third registered image included in first page image data and storing the first page image data, from which the third registered image is erased, in the storage, based on the third setting information and detection of the third registered image from the first page image data included in the input image data.

20. An information processing apparatus comprising:
a scanner configured to read an image to generate image data;
a control panel configured to set setting information associating a predetermined registered image with control information indicating whether the image data generated by the scanner is to be stored or not;
a processor configured to
    detect the registered image from the image data generated by the scanner; and
    control storing of the image data generated by the scanner in a storage based on the setting information when the processor detects the registered image is included in the image data generated by the scanner.

* * * * *